(12) United States Patent
Doken et al.

(10) Patent No.: US 12,167,075 B2
(45) Date of Patent: Dec. 10, 2024

(54) METHODS FOR CONFORMING AUDIO AND SHORT-FORM VIDEO

(71) Applicant: Adeia Guides Inc., San Jose, CA (US)

(72) Inventors: Serhad Doken, Bryn Mawr, PA (US); V. Michael Bove, Jr., Wrentham, MA (US)

(73) Assignee: Adeia Guides Inc., San Jose, CA (US)

( * ) Notice: Subject to any disclaimer, the term of this patent is extended or adjusted under 35 U.S.C. 154(b) by 110 days.

(21) Appl. No.: 17/850,470

(22) Filed: Jun. 27, 2022

(65) Prior Publication Data

US 2023/0421841 A1 Dec. 28, 2023

(51) Int. Cl.
*H04N 21/439* (2011.01)
*G06F 16/683* (2019.01)
*H04N 21/845* (2011.01)

(52) U.S. Cl.
CPC ....... *H04N 21/4394* (2013.01); *G06F 16/683* (2019.01); *H04N 21/8456* (2013.01)

(58) Field of Classification Search
None
See application file for complete search history.

(56) References Cited

U.S. PATENT DOCUMENTS

| 5,386,493 | A | 1/1995 | Degen et al. |
| 7,026,536 | B2 | 4/2006 | Lu et al. |
| 8,005,666 | B2 | 8/2011 | Goto et al. |
| 8,283,548 | B2 | 10/2012 | Oertl et al. |
| 9,880,803 | B2 * | 1/2018 | Brown ..................... G06F 3/165 |
| 2017/0062006 | A1 * | 3/2017 | Plom .................... G11B 27/031 |
| 2018/0054648 | A1 * | 2/2018 | Matias ............. H04N 21/47205 |
| 2022/0293136 | A1 * | 9/2022 | Wang ............... H04N 21/47205 |

* cited by examiner

*Primary Examiner* — Hemant S Patel
(74) *Attorney, Agent, or Firm* — Haley Guiliano LLP

(57) ABSTRACT

Systems and methods are provided herein for conforming audio to a video to avoid discordance. This may be accomplished by a system receiving a video and selection of an audio asset. The system may identify a plurality of break points in the audio asset based on one or more characteristics of the audio asset. A first portion of the audio asset may be generated based on one or more characteristics of the received video (e.g., length of the video), wherein the first portion of the audio asset begins and/or ends at a break point of the plurality of break points. The system may then generate a media item comprising the video and the first portion of the audio asset.

19 Claims, 11 Drawing Sheets

METHODS FOR CONFORMING AUDIO AND SHORT-FORM VIDEO

BACKGROUND

The present disclosure relates to the generation of media, and in particular to techniques for conforming audio and video to generate a media item.

SUMMARY

Short-form videos are an increasingly popular type of communication media on social media platforms and other websites (e.g., embedded auto play videos). These videos can range from a few seconds to a few minutes and are commonly accompanied by audio (e.g., music track, sound bite, etc.). When creating a piece of media content, traditional methodologies allow users to select a pre-generated piece of audio to accompany their video. The pairing of the pre-generated audio with a user's video often results in a sub-optimal piece of media content because the pre-generated audio is generic and fails to account for videos of differing lengths. For example, traditional methodologies may generate a piece of media content by overlaying the selected pre-generated piece of audio onto the received video. Because the piece of audio is generic and does not account for the received video's specifications, the resulting piece of media content sometimes ends in the middle of a lyric or musical phrase and can be awkward and/or jarring to a listener. The discordance of poorly paired audio and video is often exacerbated when videos are presented in a looping format. In view of these deficiencies, there exists a need to better conform audio to a video.

Accordingly, techniques are disclosed herein for conforming audio to a video to avoid discordance. When a system receives a video (e.g., a user uploads a video), the system can determine a length of the video. In some embodiments, audio is provided along with the video. For example, a user may upload a video and indicate a song (audio) to replace the video's audio or be played along with the video's audio. Once the video and audio selection are received, break points in the audio can be determined. Break points correspond to points in the audio where the audio can begin or end with minimal discordance. For example, after/before a change in the amplitude of sound, after/before a lyric, after/before a chord pattern, after/before a harmonic progression, after/before combinations of characteristics of the audio, and/or after/before similar such audio patterns. Break points may be determined by accessing metadata associated with the audio and/or by performing audio classification. The break points are used to generate a portion of audio that begins and/or ends during a break point, wherein the length of the portion of audio matches the length of the video. Once the portion of audio is generated, the system displays a media item comprising the video and the portion of audio.

A video in a looping format may require a portion of audio with different break points compared to a video in a non-looping format. For example, the portion of audio generated for a non-looping media item may not require synergy between the beats per minute (BPM) at the beginning of the portion of audio and the BPM at the end of the portion of audio. However, the portion of audio generated for a looping media item may require consistent BPMs at the beginning and end of the portion of audio to avoid discordance when the media item loops. Break points may be characterized according to video type. For example, a first plurality of break points may correspond to looping videos and a second plurality of break points may correspond to non-looping videos. The first plurality of break points may be a subset of the second plurality of break points or vice versa.

The system may also manipulate the audio to better conform to the received video. For example, after receiving the video and audio selection from a user, the system may generate a portion of audio ending at a break point of a plurality of break points. They system may determine a difference between the length of the received video and the length of the generated portion of audio. If there is a difference between the two lengths, the portion of audio may be manipulated to better conform to the received video. For example, if the portion of audio is too long, the system may trim the portion of audio. The trimmed portion of audio may end at a different break point than the non-trimmed portion of audio, but the length of the trimmed portion of audio matches the length of the video. In another example, the speed of playback of the portion of audio may be altered so that the length of the portion of audio matches the length of the video. In another example, a segment of the portion of audio may be repeated or removed in the generated portion of audio so the length of the portion of audio matches the length of the video. The system may also be able to generate break points and/or change the location of break points in the audio by manipulating the audio. For example, "fade-in" and/or "fade-out" effects can be used during a segment of the portion of audio to generate a break point and/or enhance a break point.

When a user uploads a video they may indicate that the video is a certain type (e.g., lip-synch, precision dance, looping, etc.). The system can use different break points and/or different manipulation techniques based on the indicated video type. For example, the system may not change the playback speed of a generated portion of audio if the received video is a lip-synching video. In some embodiments, the system uses image recognition and/or user input to identify that a segment of the video comprises a type. For example, the first segment of a video may comprise lip-synching while the second segment of the video does not comprise lip-synching. The system may use different break points and/or different manipulation techniques for the different segments of the video. For example, the system may manipulate the speed of playback for the video to ensure that the video is the same length as a selected portion of audio. However, the system may manipulate the speed of playback for the second segment of the video and not manipulate the speed of playback for the first segment of the video. By not manipulating the speed of playback for the first segment, the lip-synching segment of the video still synchs with the selected portion of the audio.

The system may generate a plurality of media items for display. For example, a first media item may comprise a first portion of audio sampled from the beginning of the audio asset and the second media item may comprise a second portion of audio sampled from the end of the audio asset. Each media item of the plurality of media items may be given a ranking according to attributes of the generated media item. For example, a media item may be given a high ranking if the portion of audio used in the media item ends within a threshold time value (e.g., 0.2 seconds) of a break point (e.g., the ending of a lyric). A media item may be given a lower ranking if the portion of audio used in the media item does not end within the threshold time value of a break point. In some embodiments, a media item is ranked according to more than one attributes. For example, a media item may be given a high ranking if the portion of audio used in the media item ends within a threshold time value of a first break point (e.g., the ending of a lyric) and a second break point (e.g., decrease in audio). A media item may be given a lower ranking if the portion of audio used in the media item only ends within the threshold time value of one of the two break points. The plurality of media items may all be assigned a ranking based on the weighting of a plurality of attributes associated with the plurality of media items. The system may display the plurality of media items according to rank. For example, the highest-ranking media items may be displayed first for a user. In some embodiments, the user is able to filter the generated media items based on attribute. For example, the user may want to filter the generated media items for media items where the portion of audio ends within a threshold time value of break points of a first type (e.g., end of lyric).

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
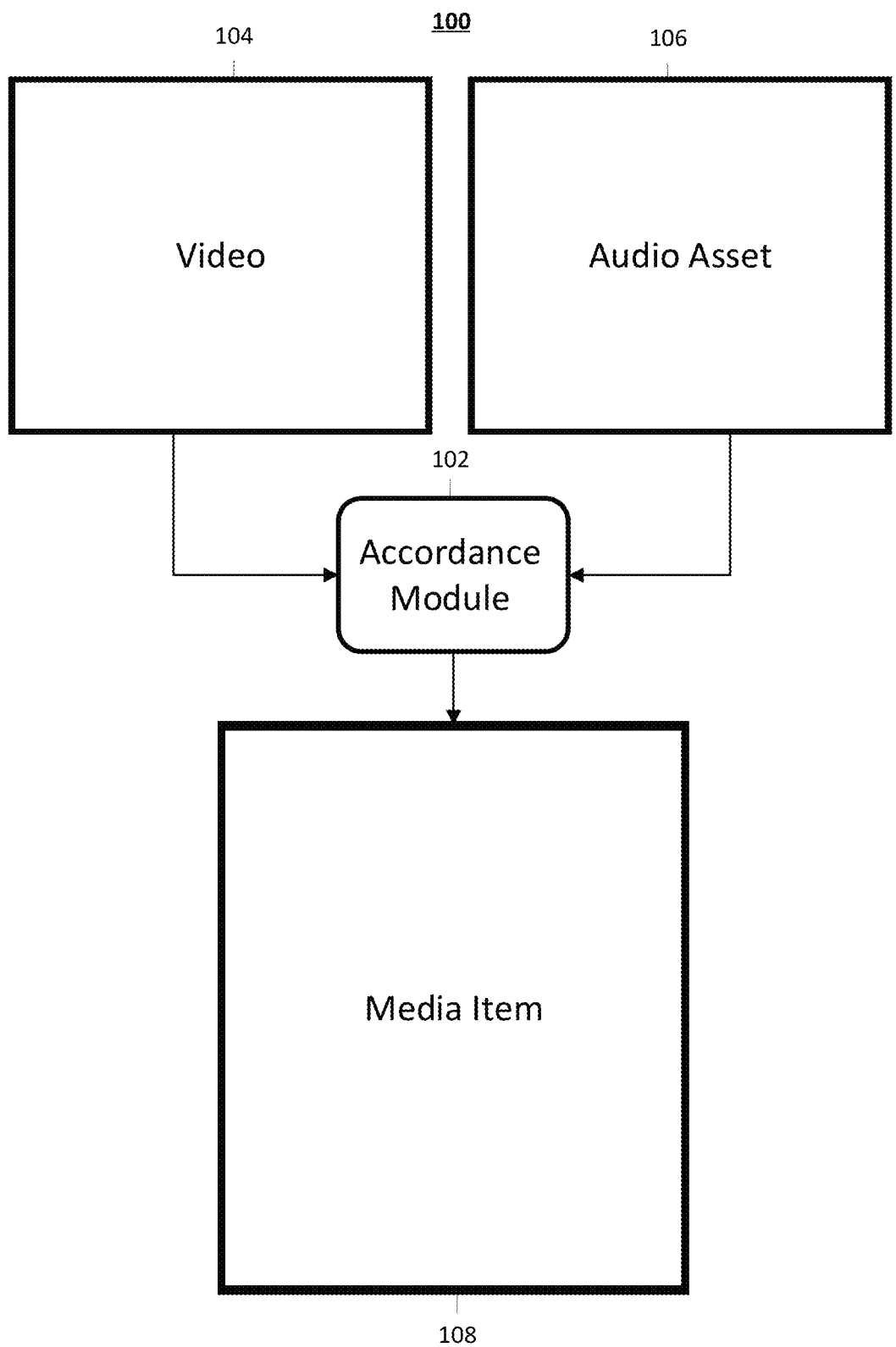
FIGS. 1A and 1B show block diagrams of an illustrative process for conforming audio to a video to avoid discordance, in accordance with embodiments of the disclosure.
Figure 1B:
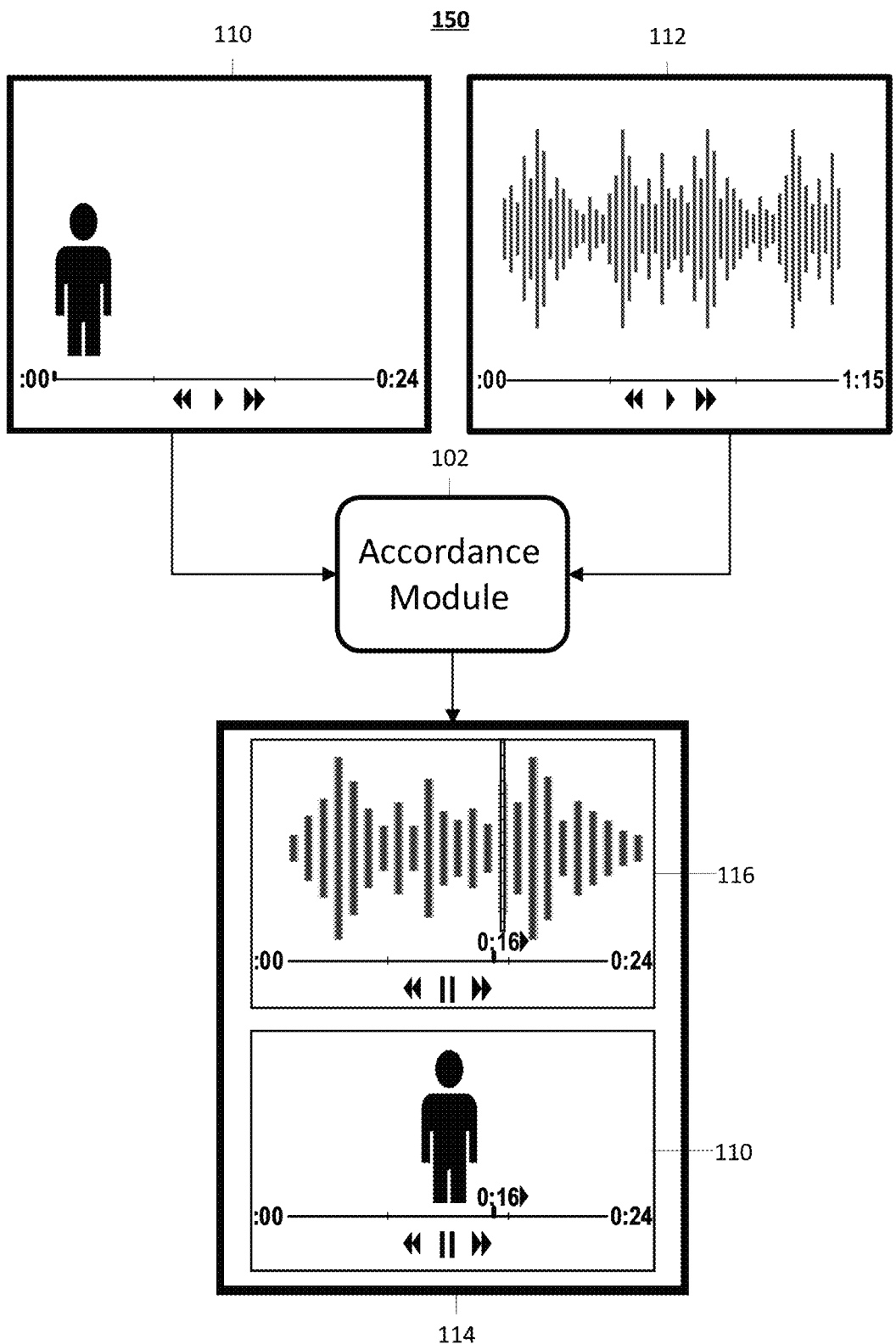

FIGS. 1A and 1B show block diagrams of an illustrative process for conforming audio to a video to avoid discordance, in accordance with embodiments of the disclosure. FIG. 1A's system 100 comprises an accordance module 102 receiving a video 104 and an audio asset 106 and outputting a media item 108. In some embodiments, the accordance module 102 is incorporated into a user equipment device (UE device), a server, and/or similar such devices. In some embodiments, one or more functions of the accordance module 102 are distributed across multiple devices.

In some embodiments, the accordance module 102 receives the video 104 from a user. For example, the user may upload the video to the accordance module 102. In another example, the accordance module 102 may have access to a plurality of videos and the user selects the video 104 from the plurality of videos. Although the video 104 is displayed as one video, the video 104 may comprise more than one video. In some embodiments, the video 104 also comprises an audio file corresponding to the video 104.

In some embodiments, the accordance module 102 also receives information about the video 104. The information about the video 104 may comprise the video type (e.g., lip-synch, precision dance, looping, etc.), video attributes (e.g., length of video, resolution of the video, etc.), and/or similar such information. In some embodiments, the video 104 comprises the information about the video 104. In some embodiments, the accordance module 102 receives the information about the video 104 separately from the video 104. For example, before or after sending the video 104 to the accordance module 102, the user may indicate that the video 104 is a lip-synch video. In some embodiments, the user indicates a synch point in the video 104. The synch point may correspond to a point in the video 104 that should align with a break point. For example, the video 104 may be a precision dance video. The user may indicate a synch point in the video 104 where the dance movements in the video 104 need to align with the end of a lyric (break point). In some embodiments, the accordance module 102 generates a media item 108 comprising a portion of audio where a break point in the portion of audio aligns with the synch point. In some embodiments, the user indicates information about the video 104 by inputting the information about the video 104 into a device (e.g., UE device) that sends the information about the video 104 to the accordance module 102. In some embodiments, the accordance module 102 determines the information about the video 104 using the video 104. For example, the accordance module 102 may determine the length of the video 104 using metadata of the video 104. In another example, the accordance module 102 may use image recognition, facial recognition, and/or similar such methodologies to determine that the video 104 displays a person lip-synching. In another example, the accordance module 102 may use image recognition, facial recognition, and/or similar such methodologies to determine a synch point in the video 104.

In some embodiments, the accordance module 102 receives the audio asset 106 from a user. For example, the user may upload the audio asset 106 when uploading the video 104 to the accordance module. In another example, the accordance module 102 may have access to a plurality of audio assets and the user selects the audio asset 106 from the plurality of audio assets. Although the audio asset 106 is displayed as one audio asset, the audio asset 106 may comprise more than one audio asset. In some embodiments, the accordance module 102 receives the audio asset 106 from a database. For example, the accordance module 102 may receive a plurality of audio assets from a server. In some embodiments, the accordance module 102 receives the audio asset 106 in response to an indication by a user. For example, when uploading the video 104 the user may select and/or input an identifier associated with the audio asset 106. In response to receiving the identifier, the accordance module 102 may request the audio asset 106 associated with the identifier from a server.

In some embodiments, the accordance module 102 also receives information about the audio asset 106. The information about the audio asset 104 may comprise an audio identifier and/or audio metadata. In some embodiments, the audio metadata comprises beat metadata, tempo metadata, rhythm metadata, lyrics metadata, pitch metadata, verse metadata, phrase metadata, harmonic progression metadata, note metadata, chord metadata, amplitude metadata, and/or similar such metadata types. In some embodiments, the audio asset 106 comprises the information about the audio asset 106. In some embodiments, the accordance module 102 receives the information about the audio asset 106 separately from the audio asset 106. In some embodiments, the accordance module 102 determines the information about the audio asset 106 using the audio asset 106. For example, the accordance module 102 may process the audio asset 106 using audio classification to determine one or more attributes corresponding to the audio asset 106. In some embodiments, the attribute(s) correspond to one or more of beat, tempo, rhythm, lyrics, pitch, verse, phrase, harmonic progression, note, chord, and/or amplitude of the audio asset 106.

In some embodiments, the accordance module 102 determines one or more break points within the audio asset 106. In some embodiments, the accordance module 102 determines one or more break points using audio metadata. For example, the accordance module 102 may use lyric metadata to determine a first break point after the completion of a lyrical sentence. In another example, the accordance module may use chord metadata to determine a second break point after the completion of a chord pattern. In some embodiments, the audio asset 106 indicates a plurality of break points when the audio asset 106 is received by the accordance module 102. For example, the audio asset 106 may comprise break point metadata indicating a plurality of break points in the audio asset 106. In some embodiments, the accordance module 102 determines the break points after receiving the audio asset 106. For example, the accordance module 106 may use audio classification to determine one or more break points.

In some embodiments, the accordance module 102 generates or selects a portion of audio based on one or more break points. For example, the accordance module 102 may select a portion of the audio asset 160, wherein the portion of the audio asset 160 has a length corresponding to the length of the video 104 and ends at a break point of the audio asset. In some embodiments, the portion of audio is generated when the accordance module 102 edits the audio asset 106. For example, the accordance module 102 may trim the audio asset 106 to generate the portion of audio. In another example, the accordance module 102 changes the speed of playback of the audio asset 106 so that the length of the portion of audio matches the length of the video 104. In another example, the accordance module 102 repeats and/or removes a segment of the audio asset 106 to generate the portion of audio so the length of the portion of audio matches the length of the video 104. In another example, the accordance module 102 inserts "fade-in" and/or "fade-out" effects to generate the portion of audio. In some embodiments, the accordance module 102 generates a plurality of portions of audio. In some embodiments, the plurality of portions of audio may vary in lengths, end points, and/or starting points.

In some embodiments, the accordance module 102 generates the portion of audio using a first set of manipulation techniques based on a video type associated with the received video 104. For example, a first set of manipulation techniques associated with a first video type (e.g., lip-synch video) may comprise trimming but not changing the playback speed. In such an example, the accordance module 102 may not change the playback speed of a generated portion of audio if the received video 104 is associated with the first video type.

In some embodiments, the accordance module 102 generates a media item 108. For example, the accordance module 102 may combine the generated portion of audio with the received video 104 to generate the media item 108. In some embodiments, the accordance module 102 replaces the audio of the video 104 with the generated portion of audio. In some embodiments, the accordance module 102 overlays the generated portion of audio onto the video 104 to generate the media item 108.

In some embodiments, the accordance module 102 manipulates the video 104 before and/or after generating the media item 108. For example, the accordance module 102 may trim the video 104, change the speed of playback of the video 104, remove and/or repeat segments of the video 104, and/or similar such techniques. In some embodiments, the media item 108 comprises the manipulated video 104 generated by the accordance module 102.

In some embodiments, the accordance module 102 uses image recognition and/or user input to identify that a segment of the received video 104 comprises a type. For example, the first segment of the video 104 may comprise lip-synching while the second segment of the video 104 does not comprise lip-synching. The accordance module 102 may use different manipulation techniques for the different segments of the video 104. For example, the accordance module 102 may manipulate the speed of playback for the second segment of the video 104 and not manipulate the speed of playback for the first segment of the video 104. By not manipulating the speed of playback for the first segment, the lip-synching segment of the video 104 still synchs with the portion of the audio.

FIG. 1B's system 150 comprises the accordance module 102 of FIG. 1A and receives a first video 110 and a first audio asset 112 and outputs a first media item 114. In some embodiments, system 150 uses the same or similar methodologies described above.

In some embodiments, the accordance module 102 receives the first video 110 from a user when the user transmits the first video 110 to the accordance module 102. In some embodiments, the first video 110 comprises visual data. In some embodiments, the first video 110 also comprises an audio file. In some embodiments, the accordance module 102 also receives information relating to the first video 110. For example, the first video 110 may comprise metadata indicating that the first video 110 is 24 seconds in length (video length) and is a precision dance video (video type).

In some embodiments, the accordance module 102 receives the first audio asset 112 from a user. For example, the user may use a UE device to select and/or input an identifier associated with the first audio asset 112. In some embodiments, in response to the user selecting the identifier, the accordance module 102 requests the first audio asset 112 from a server. In some embodiments, the first audio asset 112 is a song.

In some embodiments, the accordance module 102 generates the first media item 114 by combining a portion of audio 116 with the first video 110. In some embodiments, the accordance module 102 generates the portion of audio 116 based on one or more break points in the first audio asset 112. In some embodiments, the accordance module 102 selects the portion of audio 116 such that the length of the portion of audio 116 is the same or similar to the length of the first video 110 and ends at a break point. In some embodiments, the accordance module 102 replaces the audio of the first video 110 with the portion of audio 116. In some embodiments, the portion of audio 116 is generated by the accordance module 102 trimming the first audio asset 112 to be 24 seconds (same as first video 110) in length. In some embodiments, the accordance module 102 generates the portion of audio 116 so that it ends within a threshold time of a break point.

In some embodiments, the accordance module 102 transmits the first media item 114 for display. In some embodiments, the accordance module 102 generates more than one media items. For example, the accordance module 102 may generate a second media item in addition to the first media item 114. In some embodiments, the second media item comprises a second portion of audio. For example, the second portion of audio may end at a different break point.

In some embodiments, a plurality of media items generated by the accordance module 102 are displayed based on a ranking. The rankings may be determined according to attributes of the generated media items. For example, the first media item 114 may be given a higher ranking because the portion of audio 116 ends within a threshold time value (e.g., 0.2 seconds) of a break point (e.g., the ending of a lyric). In some embodiments, the plurality of media items are ranked according to more than one attribute. For example, the first media item 114 may be given a high ranking if the portion of audio 116 ends within a threshold time value of a first break point (e.g., the ending of a lyric) and a second break point (e.g., decrease in audio) compared to a second media item with a second portion of audio that only ends within the threshold time value of one of the two break points. In some embodiments, each media item of the plurality of media items is assigned a ranking based on the weighting of a plurality of attributes associated with the respective media item. In some embodiments, the highest-ranking media items are displayed first. In some embodiments, the list of media items can be filtered based on attribute. For example, a filter may correspond to portions of audio ending within a threshold time value of break points of a first type (e.g., end of lyric).

In some embodiments, the accordance module 102 generates the media item 108 based on preferences inputted by the user. For example, a user may indicate a preference for media items that end at a break point of a first type (e.g., end of lyric). Based on the indicated preference, the accordance module 102 can generate a media item 108 comprising a portion of audio that ends at a break point of the first type rather than a media item comprising a portion of audio that ends at a different break point of a second type (e.g., decrease in audio). In some embodiments, the accordance module 102 selects manipulation techniques based on preferences inputted by the user. For example, the user may indicate a preference for media items comprising portions of audio that are trimmed rather media items comprising portions of audio with manipulated playback speed. In such examples, the accordance module 102 may select a first type of manipulation techniques (e.g., trimming) and may not select a second type of manipulation technique (e.g., changing playback speed). In some embodiments, the user inputs more than one preference and the accordance module 102 generates the media item 108 according to the one or more preferences.

Figure 2:
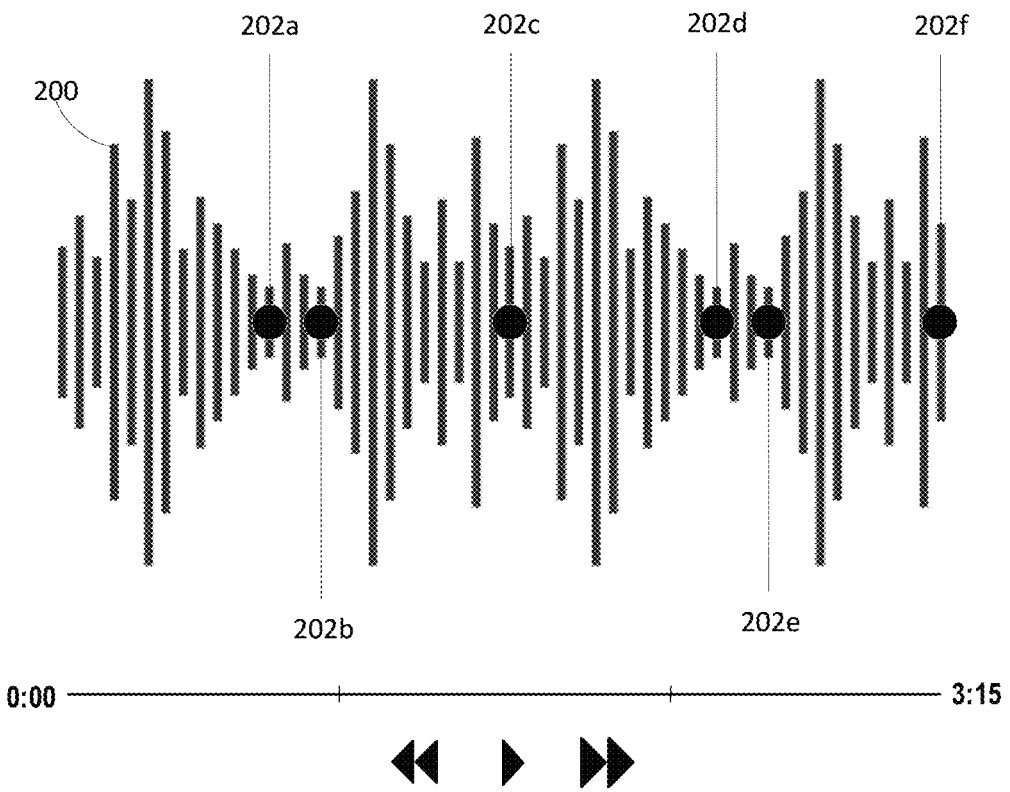
FIG. 2 shows an illustrative diagram of a system for determining break points in an audio asset, in accordance with embodiments of the disclosure.

FIG. 2 shows an illustrative diagram of a system for determining break points 202 in an audio asset 200, in accordance with embodiments of the disclosure. In some embodiments, the audio asset 200 comprises a plurality of break points 202. In some embodiments, the plurality of break points 202 correspond to changes to the amplitude of the sound of the audio asset 200, changes in lyrics of the audio asset 200, changes in chord patterns of the audio asset 200, changes of the harmonic progression of the audio asset 200, and/or similar such audio patterns. In some embodiments, a break point may be at the start of the audio asset 200 and/or at the end of a previous break point.

In some embodiments, one or more devices (e.g., accordance module 102) determines the plurality of break points 202 by accessing metadata associated with the audio asset 200. For example, a device may use lyrical metadata associated with the audio asset 200 to determine that a lyric completes at a first time in the audio asset 200. The device may categorize that time as a first break point 202*a*.

In some embodiments, one or more devices (e.g., accordance module 102) performs audio classification on the audio asset 200 to determine the plurality of break points 202. For example, a device may use audio classification to determine that the harmonic progression of the audio asset 200 changes at a second time. The device may categorize the second time as a second break point 202*b*.

In some embodiments, each break point of the plurality of break points 200 include information about the respective break point. For example, the first break point 202*a* may include data indicating that the first break point 202*a* corresponds to a lyrical break point and the second break point 202*b* may include data indicating that the second break point 202*b* corresponds to a harmonic progression break point. In another example, the third break point 202*c* may include information that the third break point 202*c* correspond to a lyrical break point and a chord pattern break point. In another example, the fourth break point 202*d* may include the BPM of the audio asset 200 during the fourth break point 202*d*.

In some embodiments, the plurality of break points 200 are ranked according to attributes of the break points. In some embodiments, an attribute may correspond to the proximity to other break points. For example, the fifth break point 202*e* may be given a higher ranking than the sixth break point 202*f* because the fifth break point 202*e* is closer to an additional break point (e.g., fourth break point 202*d*).

FIGS. 3A-3H show illustrative diagrams of a system conforming audio to a video to avoid discordance, in accordance with embodiments of the disclosure. In some embodiments, FIGS. 3A-3F use the same of similar methods and devices described in FIGS. 1A-2.

Figure 3A:
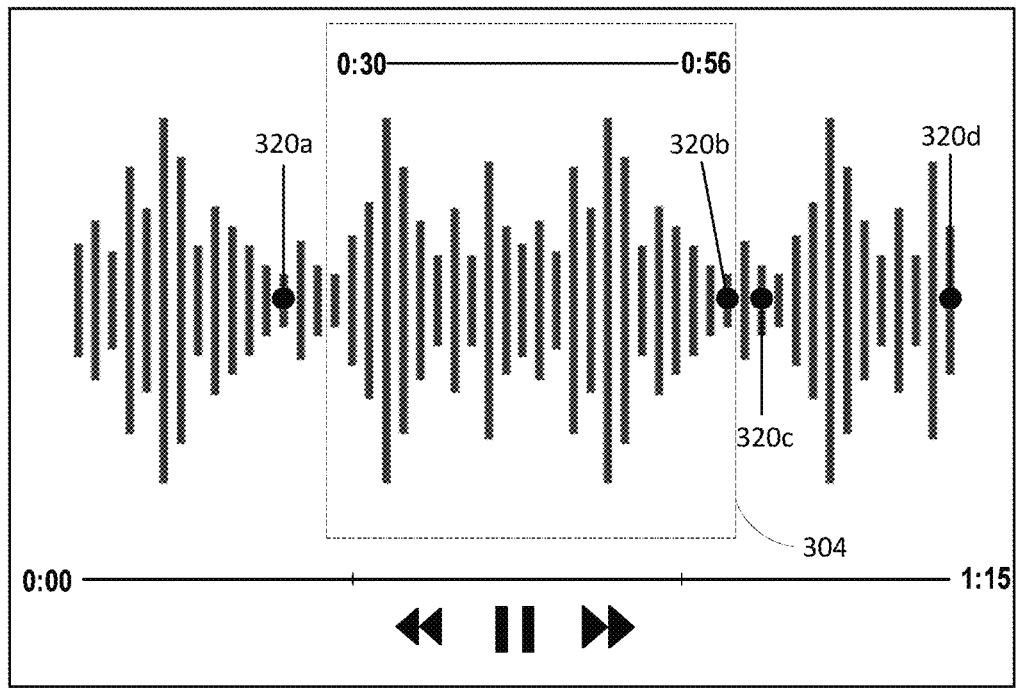
FIGS. 3A-3H show illustrative diagrams of a system conforming audio to a video to avoid discordance, in accordance with embodiments of the disclosure.
Figure 3B:
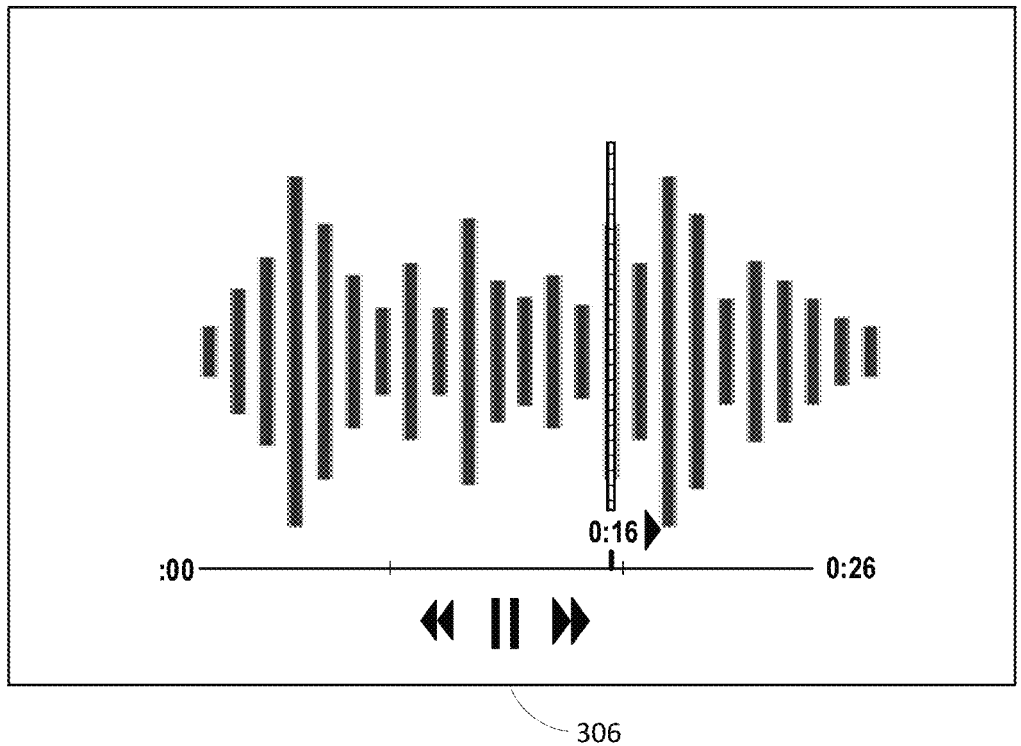

FIG. 3A shows an audio asset 302 and FIG. 3B shows a first portion of audio 306 generated using the audio asset 302. In some embodiments, an accordance module (e.g., accordance module 102) receives the audio asset 302 and manipulates the audio asset 302 to generate the first portion of audio 306. In some embodiments, the accordance module generates the first portion of audio 306 to be a length (e.g., 26 seconds). The length of the first portion of audio 306 may correspond to a received video (e.g., video 104). In some embodiments, the accordance module trims the audio asset 302 so that the first generated portion of audio 306 is the same length as the received video.

In some embodiments, the first portion of audio 306 is generated based on one or more break points 320*a*-320*d*. For example, the accordance module may select a first segment 304 of the audio asset 302, wherein the first segment 304 has a length corresponding to the length of a received video and ends within a threshold time of a break point (i.e., a second break point 320*b*). In some embodiments, the one or more break points 320*a*-320*d* are determined using the same or similar methodologies described above. In some embodiments, the accordance module identifies a plurality of segments, wherein each segment of the plurality of segments ends within the threshold time of a break point and has a length corresponding to the length of the received video. For example, an additional segment may have a length of 26 seconds and end at a third break point 320*c*. In some embodiments, the accordance module uses the first segment 304 of the audio asset 302 to generate the first portion of audio 306. In some embodiments, the first segment 304 is used as the first portion of audio 306.

Figure 3C:
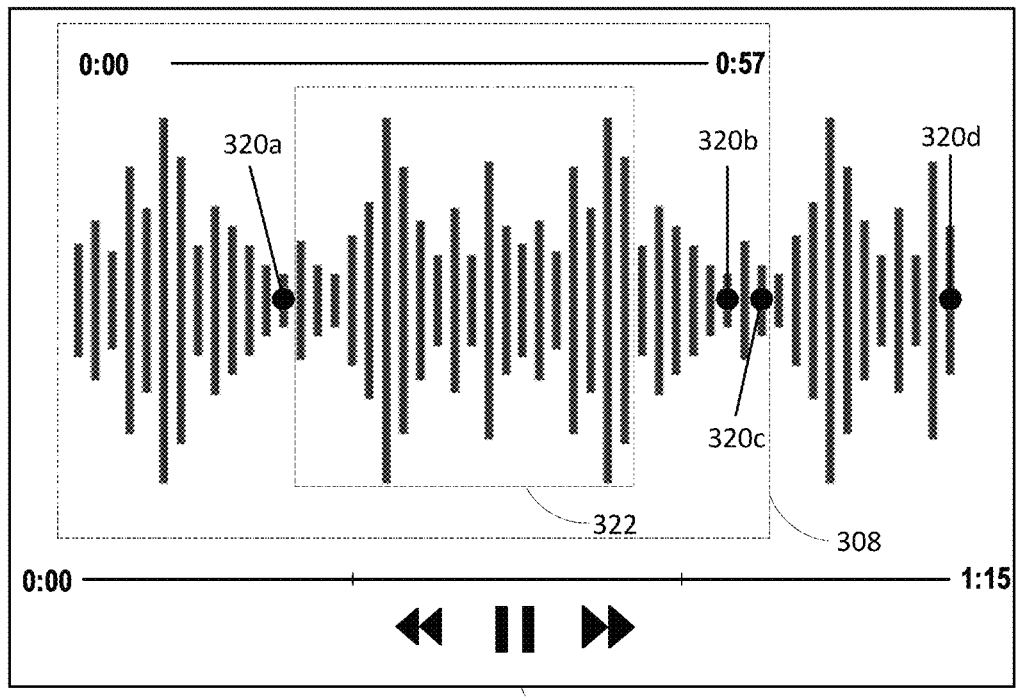
Figure 3D:
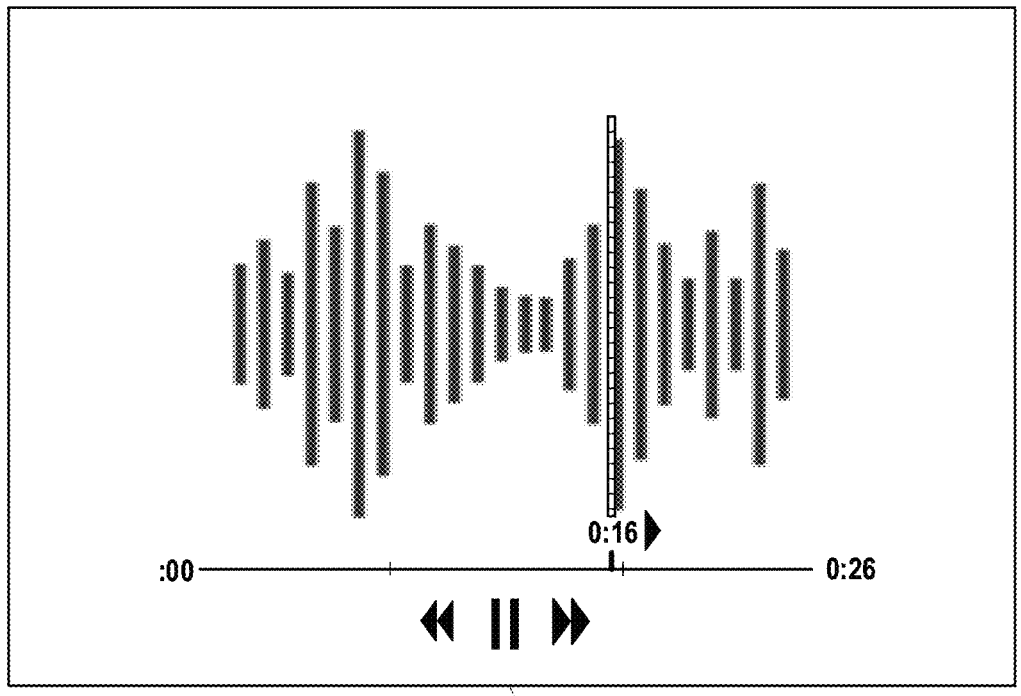

FIG. 3C shows the audio asset 302 and FIG. 3D shows a second portion of audio 310 generated using the audio asset 302. In some embodiments, the accordance module selects a second segment 308 of the audio asset 302 because the second segment 308 ends within a threshold time of a break point (i.e., a third break point 320c). In some embodiments, the accordance module selects the second segment 308 because a user requested the second segment 308 and/or parts of the second segment 308.

Figure 3E:
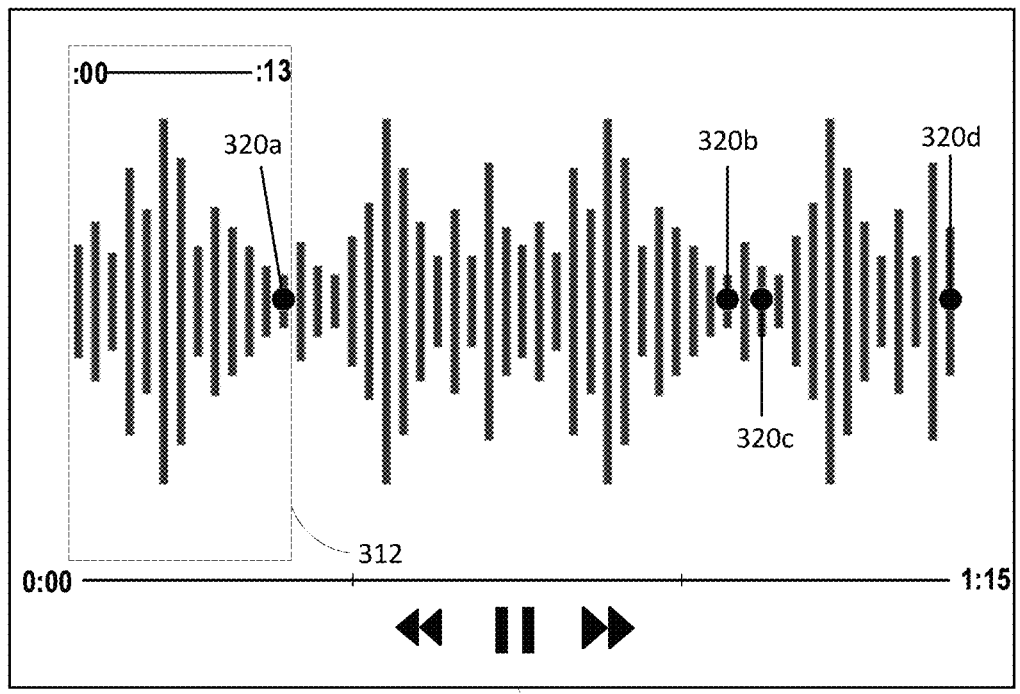
Figure 3F:
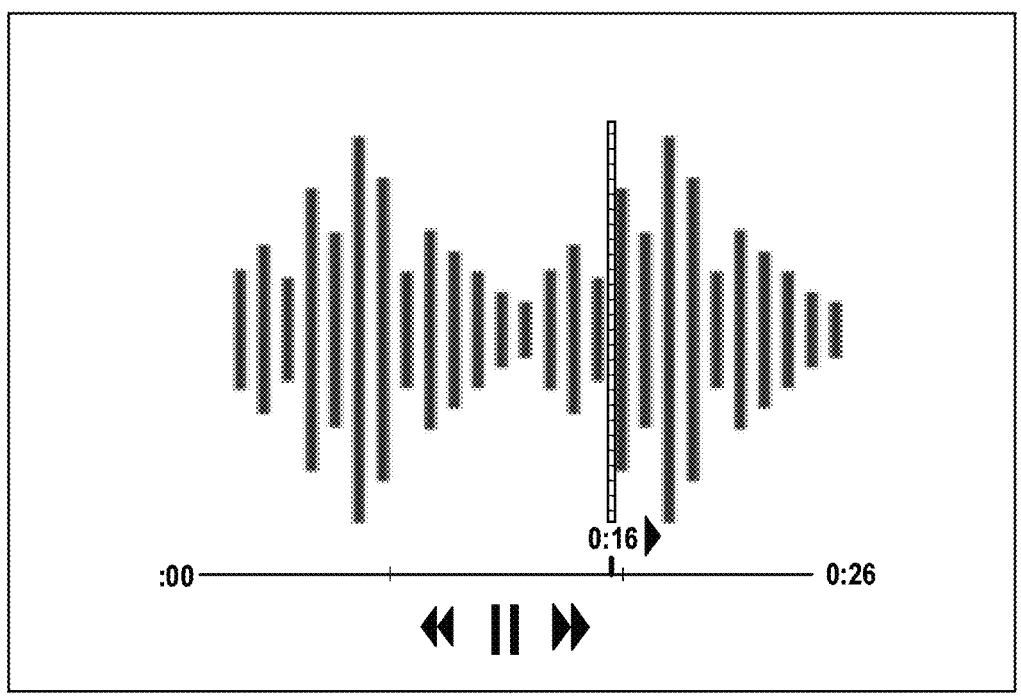

In some embodiments, the accordance module generates the second portion of audio 310 using the second segment 308. For example, the accordance module may trim the audio asset 302 so that only the second segment 308 remains. In some embodiments, the accordance module determines that the length of the second segment 308 is not the same as a received video's length. In some embodiments, the accordance module manipulates the second segment 308 to have the same or similar length as the received video. For example, the accordance module may delete one or more parts of the second segment 308 so that the length of the second portion of audio is the same or similar to the received video. In some embodiments, the accordance module determines a first part 322 of the second segment 308 to delete based on metadata associated with the audio asset 302 and/or by performing audio classification. For example, the audio asset 302 may have a first BPM before the first part 322 of the second segment 308 and may have a second BPM after the first part 322 of the second segment 308. The accordance module may determine that the first and second BPM are within a similarity threshold and that deleting the first part 322 of the second segment 308 allows for the second portion of audio 310 to have the same or similar length as the received video. In some embodiments, discordance is minimized while generating the second portion of audio 310 having the same or similar length as the received video FIG. 3E shows the audio asset 302 and FIG. 3F shows a third portion of audio 314 generated using the audio asset 302. In some embodiments, the accordance module selects a third segment 312 of the audio asset 302 because the third segment 312 ends within a threshold time of a break point (i.e., a first break point 320a). In some embodiments, the accordance module selects the third segment 312 because a user requested the third segment 312 and/or parts of the third segment 312.

In some embodiments, the accordance module generates the third portion of audio 314 using the third segment 312. For example, the accordance module may trim the audio asset 302 so that only the third segment 312 remains. In some embodiments, the accordance module determines that the length of the third segment 312 is not the same as a received video's length. In some embodiments, the accordance module manipulates the third segment 312 to have the same or similar length as the received video. In some embodiments, the accordance module duplicates the third segment 312 and/or portions of the third segment 312 so the length of the third portion of audio 314 is the same or similar to the received video's length.

Figure 3G:
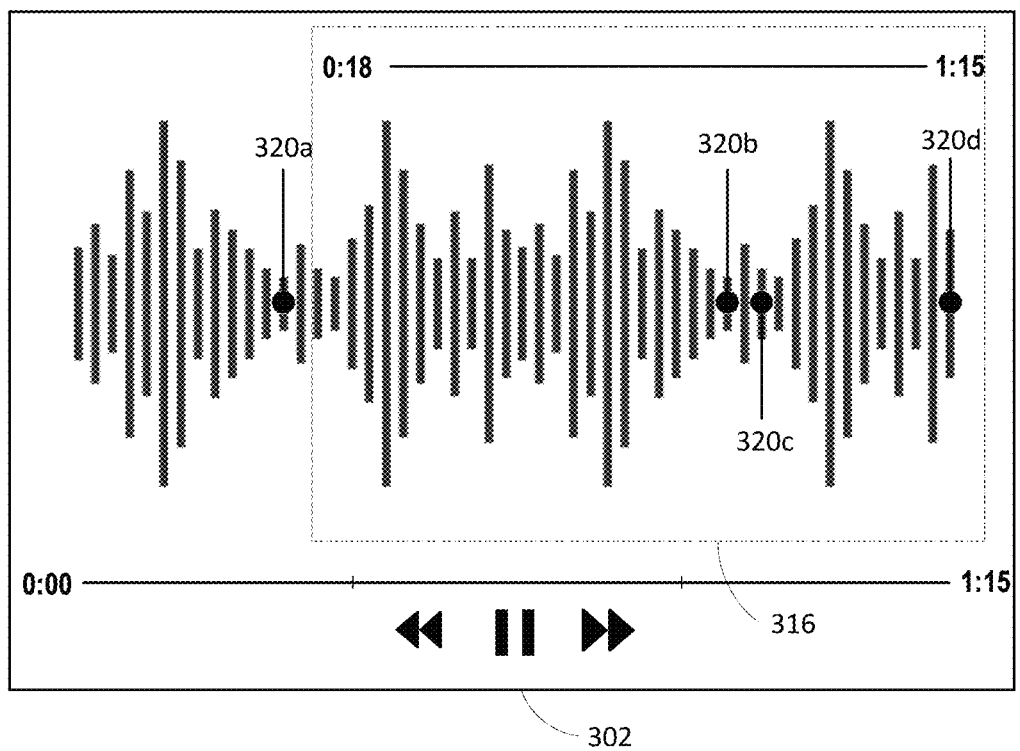
Figure 3H:
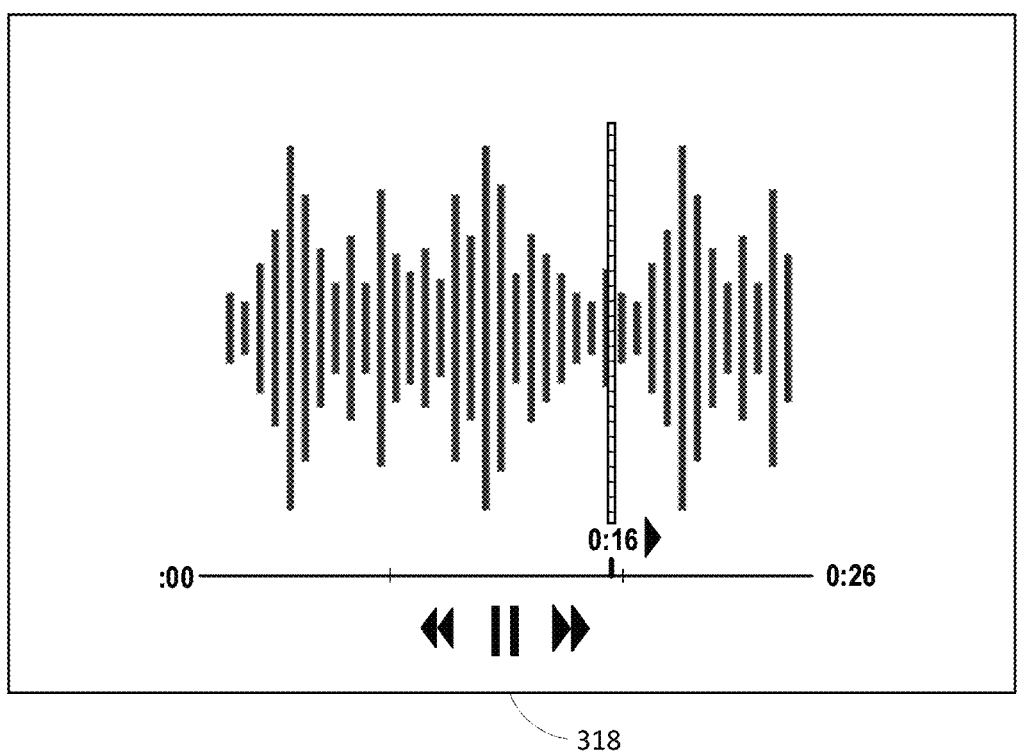

FIG. 3G shows the audio asset 302 and FIG. 3H shows a fourth portion of audio 318 generated using the audio asset 302. In some embodiments, the accordance module selects a fourth segment 316 of the audio asset 302 because the fourth segment 316 ends within a threshold time of a break point (i.e., a fourth break point 320d). In some embodiments, the accordance module selects the fourth segment 316 because a user requested the fourth segment 316 and/or parts of the fourth segment 316.

In some embodiments, the accordance module generates the fourth portion of audio 318 using the fourth segment 316. For example, the accordance module may trim the audio asset 302 so that only the fourth segment 316 remains. In some embodiments, the accordance module determines that the length of the fourth segment 316 is not the same as a received video's length. In some embodiments, the accordance module manipulates the fourth segment 316 to have the same or similar length as the received video. For example, the accordance module may speed up or slow down the fourth segment 316 so the length of the fourth portion of audio 318 is the same or similar to the received video's length. In some embodiments, the accordance module only changes the speed of the second segment 308 within a range (e.g., 75% speed, 125% speed) that does not significantly impact the listening experience of a user. In some embodiments, the accordance module only speeds up parts of the fourth segment 316 and not the entire fourth segment 316.

Figure 4:
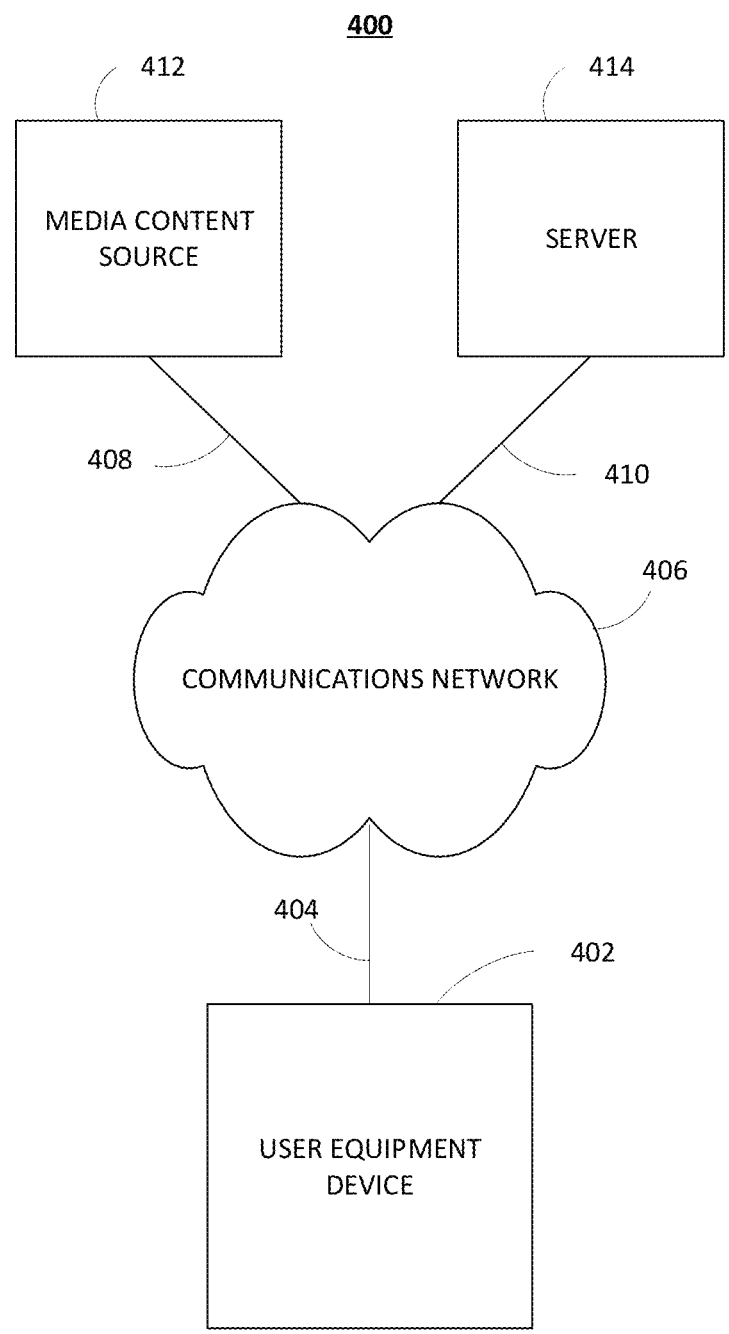
FIG. 4 shows an illustrative block diagram of a media system, in accordance with embodiments of the disclosure.
Figure 5:
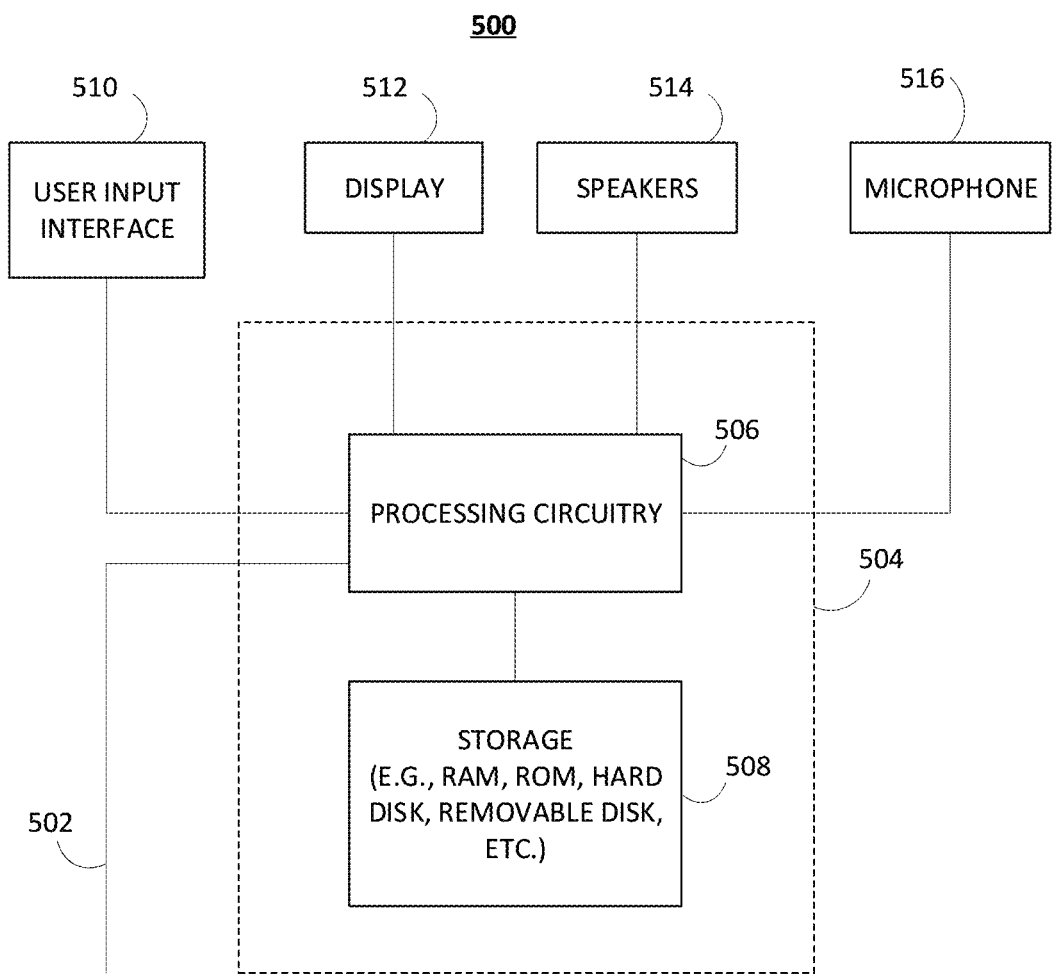
FIG. 5 shows an illustrative block diagram of a user equipment (UE) device system, in accordance with embodiments of the disclosure.

FIGS. 4-5 describe example devices, systems, servers, and related hardware for conforming audio to a video to avoid discordance, in accordance with some embodiments of the disclosure. In the system 400, there can be more than one user equipment device 402, but only one is shown in FIG. 4 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 406.

The user equipment devices may be coupled to communications network 406. Namely, the user equipment device 402 is coupled to the communications network 406 via communications path 404. The communications network 406 may be one or more networks including the Internet, a mobile phone network, mobile voice or data network (e.g., a 4G or LTE network), cable network, public switched telephone network, or other types of communications network or combinations of communications networks. The path 404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, path 404 can be a wireless path. Communications with the user equipment device 402 may be provided by one or more communications paths but is shown as a single path in FIG. 4 to avoid overcomplicating the drawing.

The system 400 also includes media content source 412, and server 414, which can be coupled to any number of databases providing information to the user equipment devices. The media content source 412 represents any computer-accessible source of content, such as a storage for media assets (e.g., audio asset), metadata, or, similar such information. The server 414 may store and execute various software modules to implement the conforming audio to a video to avoid discordance functionality. In some embodiments, the user equipment device 402, media content source 412, and server 414 may store metadata associated with a video, audio asset, and/or media item.

FIG. 5 shows a generalized embodiment of a user equipment device 500, in accordance with one embodiment. In an embodiment, the user equipment device 500 is the same user equipment device 402 of FIG. 4. The user equipment device 500 may receive content and data via input/output (I/O) path 502. The I/O path 502 may provide content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry 506 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The conforming audio to a video functionality can be at least partially implemented using the control circuitry 504. The conforming audio to a video functionality described herein may be implemented in or supported by any suitable software, hardware, or combination thereof. The conforming audio to a video functionality can be implemented on user equipment, on remote servers, or across both.

In client/server-based embodiments, the control circuitry 504 may include communications circuitry suitable for communicating with one or more servers that may at least implement the described conforming audio to a video functionality. The instructions for carrying out the above-mentioned functionality may be stored on the one or more servers.

Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing.

The user equipment device 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of user equipment device 500 or may be a stand-alone unit.

The user equipment device 500 of FIG. 5 can be implemented in system 400 of FIG. 4 as user equipment device 402, but any other type of user equipment suitable for conforming audio to a video may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 6:
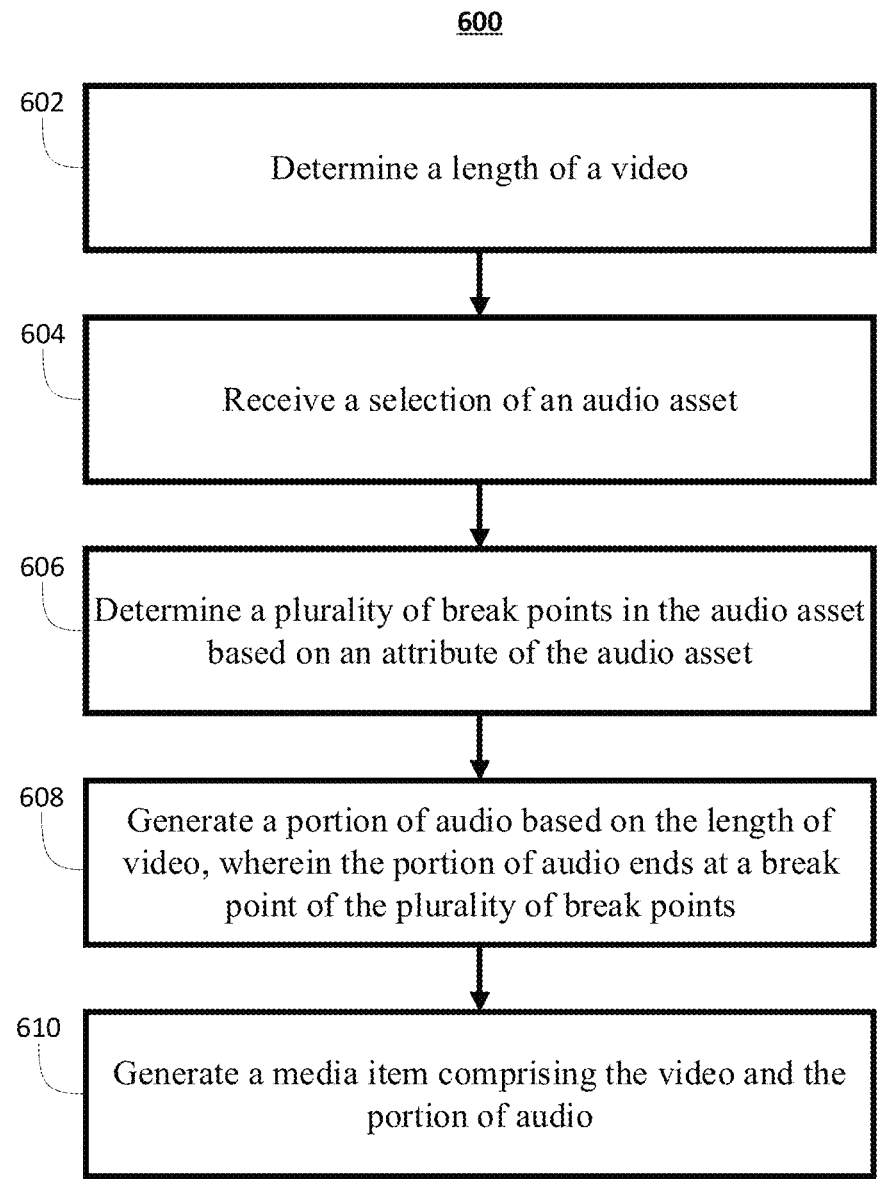
FIG. 6 is an illustrative flowchart of a process for conforming audio to a video to avoid discordance, in accordance with embodiments of the disclosure.

FIG. 6 is an illustrative flowchart of a process 600 for conforming audio to a video to avoid discordance, in accordance with embodiments of the disclosure. Process 600, and any of the following processes, may be executed by control circuitry 504 on a user equipment device 500. In some embodiments, control circuitry 504 may be part of a remote server separated from the user equipment device 500 by way of a communications network or distributed over a combination of both. In some embodiments, instructions for executing process 600 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry, and the like. It should be noted that the process 600, or any step thereof, could be performed on, or provided by, any of the devices shown in FIGS. 1A-5. Although the process 600 is illustrated as described as a sequence of steps, it is contemplated that various embodiments of process 600 may be performed in any order or combination and need not include all the illustrated steps.

At 602, control circuitry determines a length of a video. In some embodiments, the control circuitry receives the video from a user. For example, the user may transmit the video to the control circuitry. In another example, the control circuitry may have access to a database with a plurality of videos and the user selects the video from the plurality of videos. In some embodiments, the control circuitry determines information about the video (e.g., video type, video attributes, etc.) using metadata, input from the user, and/or similar such data. For example, the received video may comprise metadata that the control circuitry can use to determine information about the video. In some embodiments, the control circuitry receives information about the video before and/or after receiving the video. For example, after sending the video to the control circuitry, the user may indicate that the video is a lip-synch video. In some embodiments, the user indicates information about the video by inputting the information about the video into a device (e.g., UE device) and the device transmits the information about the video to the control circuitry. In another example, the control circuitry may use image recognition, facial recognition, and/or similar such methodologies to determine information about the video. For example, using facial recognition the control circuitry may determine that a person in the received video is lip-synching so the received video is a lip-synching video.

At 604, control circuitry receives a selection of an audio asset. In some embodiments, the control circuitry receives the selection of the audio asset from a user. For example, the user may transmit the audio asset when transmitting the video to the control circuitry. In another example, the control circuitry may have access to a plurality of audio assets and receives a selection when the user selects the audio asset from the plurality of audio assets. In some embodiments, the control circuitry receives the audio asset from a database. For example, the control circuitry may receive a plurality of audio assets from a server. In some embodiments, the control circuitry receives the audio asset in response to an indication by a user. For example, the user may select and/or input an identifier associated with the audio asset. In response to receiving the identifier, the control circuitry may request the audio asset associated with the identifier from a server.

In some embodiments, the control circuitry also receives information about the audio asset. In some embodiments, the audio asset comprises the information about the audio asset. In some embodiments, the control circuitry receives the information about the audio asset separately from the audio asset. For example, after receiving the selection of the audio asset, the control circuitry may request information about the audio asset from a server. In some embodiments, the control circuitry determines the information about the audio asset using the audio asset. For example, the control circuitry may process the audio asset using audio classification to determine one or more attributes corresponding to the audio asset. In some embodiments, the one or more attributes correspond to a beat, tempo, rhythm, lyrics, pitch, verse, phrase, harmonic progression, note, chord, and/or amplitude of the audio asset.

At 606, control circuitry determines a plurality of break points in the audio asset based on an attribute of the audio asset. In some embodiments, the received audio asset comprises break point metadata that the control circuitry uses to determine a plurality of break points in the audio asset. In some embodiments, the control circuitry determines the break points using audio classification. In some embodiments, the control circuitry determines one or more break points based on completion of one or more attributes of the audio asset. For example, the control circuitry may determine a first break point in the audio asset when a lyric completes. In another example, the control circuitry may determine a second break point in the audio asset after the completion of a chord pattern. In some embodiments, the control circuitry determines one or more break points based on a change of one or more attributes of the audio asset. For example, the control circuitry may determine a third break point in the audio asset when the BPM of the audio asset changes from a first range (e.g., 80-90 BPM) to a second range (e.g., 100-110 BPM).

In some embodiments, each break point of the plurality of break points includes information about the respective break point. For example, a first break point may include data indicating that the first break point corresponds to a lyrical break point and a second break point may include data indicating that the second break point corresponds to a harmonic progression break point. In another example, a third break point may include information that the third break point corresponds to a lyrical break point and a chord pattern break point. In another example, a fourth break point may include the BPM of the audio asset at the fourth break point.

At 608, control circuitry generates a portion of audio based on the length of the video, wherein the portion of the audio ends at a break point of the plurality of break points. For example, the control circuitry may select a portion of the audio asset, wherein the portion of the audio has a length corresponding to the length of the video and ends at a break point. In some embodiments, the portion of audio is generated when the control circuitry manipulates the audio asset. For example, the control circuitry may trim the audio asset to generate the portion of audio so that the length of the portion of audio matches the length of the video. In another example, the control circuitry may change the speed of playback of the audio asset so that the length of the portion of audio matches the length of the video. In another example, the control circuitry may repeat and/or remove one or more segments of the audio asset to generate the portion of audio so the length of the portion of audio matches the length of the video. In some embodiments, the control circuitry generates the portion of the audio where the portion of audio ends within a first threshold time (e.g., within 2 second) of a break point. In some embodiments, the control circuitry generates the portion of audio where the length of the portion of audio is within a second threshold time of the received video. The first and second threshold times can be the same, similar, or different. In some embodiments, the control circuitry manipulations the portion of audio to increase accordance. For example, the control circuitry may generate a portion of audio that ends 1.9 seconds away from a break point. The control circuitry may insert a "fade-out" effect at the end of the portion of audio to increase accordance.

In some embodiments, the control circuitry generates the portion of audio using a first set of manipulation techniques based on a video type associated with the received video. For example, a first set of manipulation techniques associated with a first video type (e.g., lip-synch video) may comprise trimming but not changing the playback speed. In such an example, the control circuitry may not change the playback speed of the generated portion of audio if the received video is associated with the first video type.

At 610, control circuitry generates a media item comprising the video and the portion of the audio. In some embodiments, the control circuitry combines the generated portion of audio with the received video to generate the media item. In some embodiments, the control circuitry replaces audio corresponding to the video with the generated portion of audio. In some embodiments, the control circuitry overlays the generated portion of audio onto the video to generate the media item. In some embodiments, the control circuitry displays the media item for the user. In some embodiments, the control circuitry transmits the media item to a device (e.g., server, UE device, etc.).

In some embodiments, the control circuitry generates a plurality of media items. In some embodiments, each media item of the plurality of media items comprises different portions of audio. For example, a second media item may comprise a second portion of audio which ends at a different break point.

In some embodiments, the control circuitry ranks the plurality of media items. In some embodiments, the rankings may be used to order the display of the plurality of media items. In some embodiments, the control circuitry determines the rankings according to attributes of the plurality of media items. For example, the control circuitry may assign a first media item a higher ranking because the first media item comprises a first portion of audio that ends within a threshold time value (e.g., 0.2 seconds) of a break point (e.g., the ending of a lyric). In some embodiments, the control circuitry ranks the plurality of media items according to more than one attributes. For example, a first media item may comprise a first portion of audio within a threshold time value of a first break point (e.g., the ending of a lyric) and a threshold time value of a second break point (e.g., decrease in audio) and a second media item may comprise a second portion of audio that ends within the threshold time value of one of the two break points. The control circuitry may rank the first media item higher than the second media item because the first portion of audio is within a threshold distance of more break points. In some embodiments, the control circuitry ranks the plurality of media by weighting a plurality of attributes associated with the respective media items. In some embodiments, the control circuitry displays the highest-ranking media items first. In some embodiments, the control circuitry provides a list of media items that can be filtered based on attribute. For example, a user may select a filter corresponding to portions of audio ending within a threshold time value of break points of a first type (e.g., end of lyric) and the control circuitry will display a plurality of media items comprising portions of audio with the selected attribute.

In some embodiments, the plurality of break points associated with an audio asset are ranked. For example, a first break point of a first type (e.g., end of lyric) may be ranked higher than a second break point of a second type (e.g., beginning of a harmonic progression). In another example, a first break point within a threshold time of the end of a lyric may be ranked higher than a second break point that is not within the threshold time of the end of the lyric. In some embodiments, the control circuitry ranks the plurality of break points according to more than one attribute. For example, a first break point within a first threshold time of the end of lyric and within a second threshold time of the end of a harmonic progression may be ranked higher than a second break point within a third threshold time of the end of a harmonic progression. In some embodiments, the control circuitry ranks the plurality of break points by weighting a plurality of attributes associated with the respective break points. In some embodiments, the plurality of media items are ranked according to the break points associated with each media item. For example, the control circuitry may assign a first media item a higher ranking because the first media item comprises a first portion of audio that ends at a break point with a higher ranking. The control circuitry may assign a second media item a lower ranking because the second media item comprises a second portion of audio that ends at a second break point with a lower ranking.

Figure 7:
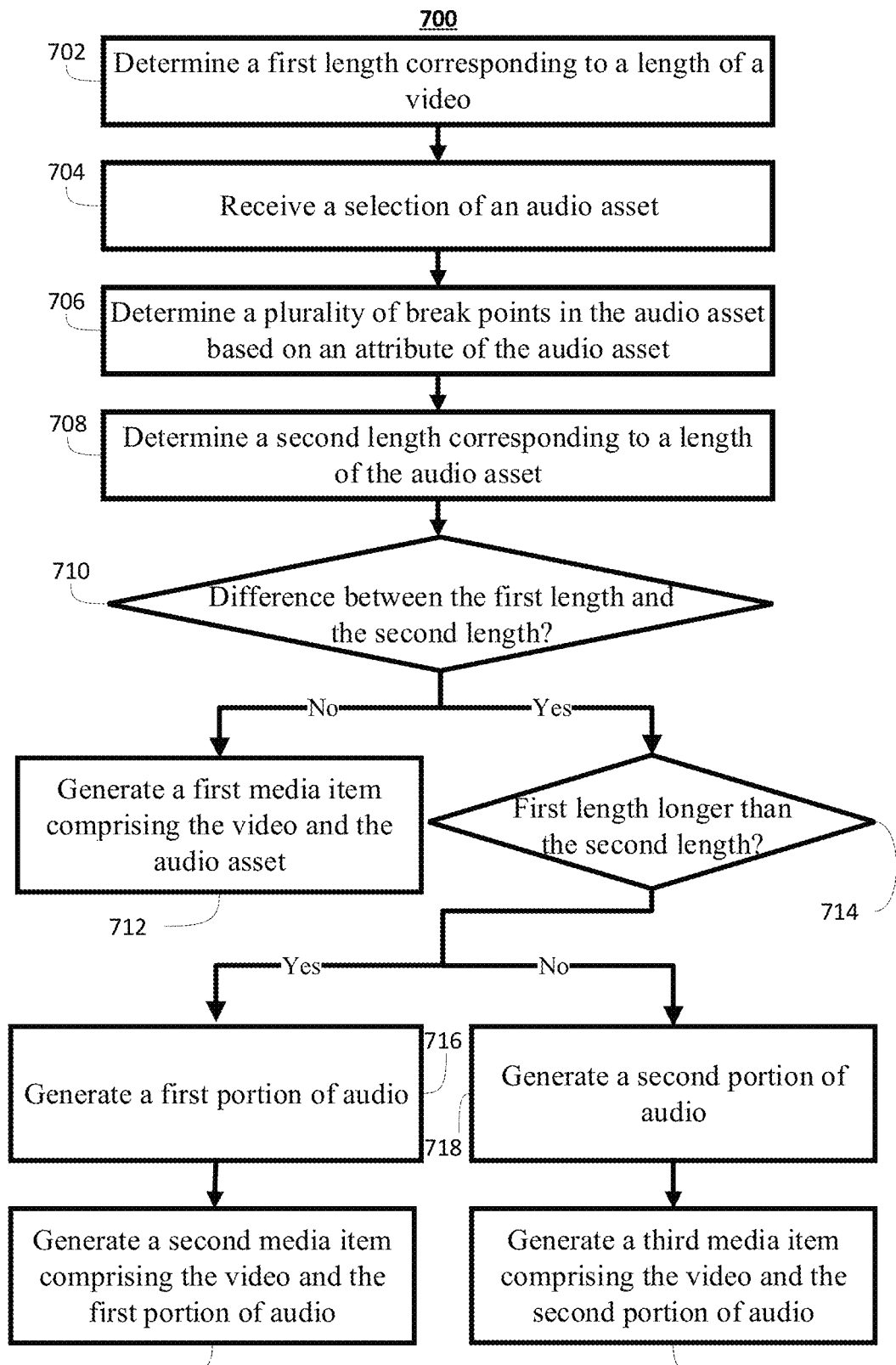
FIG. 7 is another illustrative flowchart of a process for conforming audio to a video to avoid discordance, in accordance with embodiments of the disclosure.

FIG. 7 is an illustrative flowchart of a process 700 for conforming audio to a video to avoid discordance, in accordance with embodiments of the disclosure.

At 702, control circuitry determines a first length corresponding to a length of a video. In some embodiments, the control circuitry uses the same or similar methodologies described in step 602 above.

At 704, control circuitry receives a selection of an audio asset. In some embodiments, the control circuitry uses the same or similar methodologies described in step 604 above.

At 706, control circuitry determines a plurality of break points in the audio asset based on a characteristic of the audio asset. In some embodiments, the control circuitry uses the same or similar methodologies described in step 606 above.

At 708, control circuitry determines a second length corresponding to a length of the audio asset. In some embodiments, the control circuitry receives information (e.g., metadata) about the audio asset and uses the received information to determine the second length corresponding to the length of the audio asset.

At 710, control circuitry determines whether there is a difference between the first length and the second length. If there is no difference between the first length and the second length, the process 700 continues to step 712. If there is a difference between the first length and the second length, the process 700 continues to step 714. In some embodiments, the control circuitry uses a difference threshold. For example, if the difference between the first length and the second length is less than the difference threshold (e.g., 2 seconds) the control circuitry may determine that there is no difference between the first length and the second length.

At 712, control circuitry generates a first media item comprising the video and the audio asset. In some embodiments, the control circuitry combines the audio asset with the received video to generate the first media item. In some embodiments, the control circuitry replaces audio corresponding to the video with the audio asset. In some embodiments, the control circuitry overlays the audio asset onto the video to generate the first media item. In some embodiments, the control circuitry displays the first media item for the user. In some embodiments, the control circuitry transmits the first media item to a device.

At 714, control circuitry determines whether the first length is larger than the second length. If the first length is larger than the second length, the process 700 continues to step 716. If the first length is not larger than the second length, the process 700 continues to step 718.

At 716, control circuitry generates a first portion of the audio asset. In some embodiments, control circuitry generates the first portion of audio based on the first length of the video, wherein the first portion of the audio ends at a break point of the plurality of break points. For example, the control circuitry may loop the audio asset and/or segments of the audio asset so the length of the first portion of audio is the same or similar as the first length of the video. In another example, the control circuitry may combine other audio with the audio asset to generate the first portion of audio so the length of the first portion of audio is the same or similar as the first length of the video. In another example, the control circuitry may slow the speed of the audio asset so the length of the first portion of audio is the same or similar as the first length of the video.

In some embodiments, the control circuitry generates the first portion of audio so the first portion of the audio ends within a first threshold time (e.g., within 2 second) of a break point. In some embodiments, the control circuitry generates the first portion of audio so the length of the first portion of audio is within a second threshold time of the first length of the video. The first and second threshold times can be the same, similar, or different.

In some embodiments, control circuitry also manipulates the video. For example, the control circuitry may trim the video so the length of video is the same or similar to the length of first portion of audio. In another example, the control circuitry may speed up the video so the length of video is the same or similar to the length of the first portion of audio. In some embodiments, the control circuitry manipulates the video so that less manipulation of the audio asset is required to make the lengths of the video and generated portion of audio the same or similar. For example, the control circuitry may change the speed of the audio asset to generate the first portion of audio where the length of first portion of audio is not within a similarity threshold of the first length of the video. In such an example, the control circuitry may trim the video so the length of the trimmed video and length of the first portion of audio are within the similarity threshold.

At 718, control circuitry generates a second portion of the audio asset. In some embodiments, control circuitry generates the second portion of audio based on the first length of the video, wherein the second portion of the audio ends at a break point of the plurality of break points. For example, the control circuitry may trim the audio asset so the length of the second portion of audio is the same or similar as the first length of the video. In another example, the control circuitry may remove, add, and/or loop segments of the audio asset so the length of the second portion of audio is the same or similar as the first length of the video. In another example, the control circuitry may slow the speed of the audio asset so the length of the second portion of audio is the same or similar as the first length of the video.

In some embodiments, the control circuitry generates the second portion of audio so the second portion of audio ends within a first threshold time (e.g., within 2 second) of a break point. In some embodiments, the control circuitry generates the second portion of audio so the length of the second portion of audio is within a second threshold time of the first length video. The first and second threshold times can be the same, similar, or different.

In some embodiments, control circuitry also manipulates the video. For example, the control circuitry may loop the video so the length of video is the same or similar as the length of second portion of audio. In another example, the control circuitry may slow down the video so the length of video is the same or similar as the length of the second portion of audio. In some embodiments, the control circuitry manipulates the video so that less manipulation of the audio asset is required to make the lengths of the video and generated portion of audio the same or similar. For example, the control circuitry may change the speed of the audio asset to generate the second portion of audio where the length of the second portion of audio is not within a similarity threshold of the first length of the video. In such an example, the control circuitry may loop the video and/or a segment of the video so the length of the edited video and length of the second portion of audio are within the similarity threshold.

At 720, control circuitry generates a second media item comprising the video and the first portion of the audio asset. In some embodiments, the control circuitry combines the first portion of audio with the received video to generate the second media item. In some embodiments, the control circuitry combines the first portion of audio with the edited video to generate the second media item. In some embodiments, the control circuitry replaces audio corresponding to the video with the first portion of audio. In some embodiments, the control circuitry overlays the first portion of audio onto the video to generate the second media item. In some embodiments, the control circuitry displays the second media item for the user. In some embodiments, the control circuitry transmits the second media item to a device.

At 722, control circuitry generates a third media item comprising the video and the second portion of the audio asset. In some embodiments, the control circuitry combines the second portion of audio with the received video to generate the third media item. In some embodiments, the control circuitry combines the second portion of audio with the edited video to generate the third media item. In some embodiments, the control circuitry replaces audio corresponding to the video with the second portion of audio. In some embodiments, the control circuitry overlays the second portion of audio onto the video to generate the third media item. In some embodiments, the control circuitry displays the third media item for the user. In some embodiments, the control circuitry transmits the third media item to a device.

It is contemplated that some suitable steps or suitable descriptions of FIGS. 6-7 may be used with other suitable embodiments of this disclosure. In addition, some suitable steps and descriptions described in relation to FIGS. 6-7 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-7.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a video comprising a plurality of segments;
determining a first type associated with a first segment of the plurality of segments;
determining a second type associated with a second segment of the plurality of segments, wherein the second type is different than the first type;
determining a length of the first segment;
determining a length of the second segment;
receiving a selection of an audio asset;
determining a plurality of break points in the audio asset based on a characteristic of the audio asset;
generating a first portion of the audio asset based on the length of the first segment and the first type associated with the first segment, wherein the first portion of the audio asset spans the length of the first segment;
generating a second portion of the audio asset based on the length of the second segment and the second type associated with the second segment, wherein the second portion of the audio asset ends at a break point of the plurality of break points; and
generating a media item comprising the first segment of the plurality of segments, the second segment of the plurality of segments, the first portion of the audio asset, and the second portion of the audio asset.

2. The method of claim 1, wherein the characteristic corresponds to a decrease in an amplitude of sound of the audio asset.

3. The method of claim 1, wherein the characteristic corresponds to an end of lyric.

4. The method of claim 1, wherein the characteristic corresponds to an end of a chord pattern.

5. The method of claim 1, wherein the characteristic corresponds to an end of a harmonic progression.

6. The method of claim 1, wherein the audio comprises metadata corresponding the characteristic.

7. The method of claim 1, further comprising:
generating a third portion of the audio asset based on the length of the first segment and the length of second segment, wherein the third portion of the audio asset ends at a second break point of the plurality of break points; and
generating a second media item comprising the first segment, the second segment, and the third portion of audio.

8. The method of claim 7, further comprising:
ranking the first media item based on an attribute of the first media item;
ranking the second media item based on an attribute of the second media item; and
displaying the first media item and the second media item according to the ranking of the first media item and the ranking of the second media item.

9. The method of claim 1, further comprising:
receiving an indication that the media item will be looped; and
determining a subset of the plurality of break points based on the indication.

10. An apparatus, comprising:
control circuitry; and
at least one memory including computer program code for one or more programs, the at least one memory and the computer program code configured to, with the control circuitry, cause the apparatus to perform at least the following:
receiving a video comprising a plurality of segments;
determine a first type associated with a first segment of the plurality of segments;
determine a second type associated with a second segment of the plurality of segments, wherein the second type is different than the first type;
determine a length of the first segment;
determine a length of the second segment;
receive a selection of an audio asset;
determine a plurality of break points in the audio asset based on a characteristic of the audio asset;
generate a first portion of the audio asset based on the length of the first segment and the first type associated with the first segment, wherein the first portion of the audio asset spans the length of the first segment;
generate a second portion of the audio asset based on the length of the second segment and the second type associated with the second segment, wherein the second portion of the audio asset ends at a break point of the plurality of break points; and
generate a media item comprising the first segment of the plurality of segments, the second segment of the plurality of segments, the first portion of the audio asset, and the second portion of the audio asset.

11. The apparatus of claim 10, wherein the characteristic corresponds to a decrease in an amplitude of sound of the audio asset.

12. The apparatus of claim 10, wherein the characteristic corresponds to an end of lyric.

13. The apparatus of claim 10, wherein the characteristic corresponds to an end of a chord pattern.

14. The apparatus of claim 10, wherein the characteristic corresponds to an end of a harmonic progression.

15. The apparatus of claim 10, wherein the audio asset comprises metadata corresponding the characteristic.

16. The apparatus of claim 10, wherein the apparatus is further caused to:
generate a third portion of the audio asset based on the length of the first segment and the length of second segment, wherein the third portion of the audio asset ends at a second break point of the plurality of break points; and
generate a second media item comprising the first segment, the second segment, and the third portion of audio.

17. The method of claim 16, further comprising:
ranking the first media item based on an attribute of the first media item;
ranking the second media item based on an attribute of the second media item; and
displaying the first media item and the second media item according to the ranking of the first media item and the ranking of the second media item.

18. The apparatus of claim 10, wherein the apparatus is further caused to:
receive an indication that the media item will be looped; and
determine a subset of the plurality of break points based on the indication.

19. A non-transitory computer-readable medium having instructions encoded thereon that, when executed by control circuitry, cause the control circuitry to:
receiving a video comprising a plurality of segments;
determine a first type associated with a first segment of the plurality of segments;
determine a second type associated with a second segment of the plurality of segments, wherein the second type is different than the first type;
determine a length of the first segment;
determine a length of the second segment;
receive a selection of an audio asset;
determine a plurality of break points in the audio asset based on a characteristic of the audio asset;
generate a first portion of the audio asset based on the length of the first segment and the first type associated with the first segment, wherein the first portion of the audio asset spans the length of the first segment;
generate a second portion of the audio asset based on the length of the second segment and the second type associated with the second segment, wherein the second portion of the audio asset ends at a break point of the plurality of break points; and
generate a media item comprising the first segment of the plurality of segments, the second segment of the plurality of segments, the first portion of the audio asset, and the second portion of the audio asset.

* * * * *